United States Patent [19]

Works et al.

[11] Patent Number: 4,974,146
[45] Date of Patent: Nov. 27, 1990

[54] ARRAY PROCESSOR

[75] Inventors: George A. Works; William L. Hicks; Richard L. Kasbo; Ernest E. Muenchau, all of San Diego; Stephen R. Deiss, Encinitas, all of Calif.

[73] Assignee: Science Applications International Corporation, San Diego, Calif.

[21] Appl. No.: 191,207

[22] Filed: May 6, 1988

[51] Int. Cl.⁵ .................................................. G06F 15/347
[52] U.S. Cl. ..................................... 364/200; 364/231.8; 364/231.9; 364/232.22; 364/232.21; 364/243.3; 364/255.5
[58] Field of Search ............... 364/200, 900, 231.8, 364/231.9, 232.22, 254.8, 243.3, 255.5, 230.6; 365/189.01, 230

[56] References Cited

U.S. PATENT DOCUMENTS

| | | | |
|---|---|---|---|
| 3,394,354 | 7/1968 | Senzig | 364/200 |
| 3,470,540 | 4/1987 | Levy | 364/200 |
| 4,128,880 | 12/1978 | Gray, Jr. | 364/200 |
| 4,204,254 | 5/1980 | Muzzani et al. | 364/200 |
| 4,251,860 | 2/1981 | Mitchell et al. | 364/200 |
| 4,285,039 | 8/1981 | Patterson et al. | 364/200 |
| 4,287,566 | 9/1981 | Culler | 364/200 |
| 4,298,936 | 11/1981 | Shapiro | 364/200 |
| 4,339,804 | 7/1982 | Davison et al. | 364/900 |
| 4,366,536 | 12/1982 | Kohn | 364/200 |
| 4,368,515 | 1/1983 | Nielsen | 364/200 |
| 4,432,053 | 2/1984 | Gaither et al. | 364/200 |
| 4,438,488 | 3/1984 | Shibayama et al. | 364/200 |
| 4,438,493 | 3/1984 | Cushing et al. | 364/200 |
| 4,454,578 | 6/1984 | Matsumoto et al. | 364/200 |
| 4,527,232 | 7/1985 | Bechtolsheim | 364/200 |
| 4,530,050 | 7/1985 | Fukunaga | 364/200 |
| 4,541,047 | 9/1985 | Wada et al. | 364/200 |
| 4,550,368 | 10/1985 | Bechtolsheim | 364/200 |
| 4,569,016 | 2/1986 | Hao et al. | 364/200 |
| 4,574,348 | 3/1981 | Scallom | 364/200 |
| 4,581,722 | 4/1986 | Takemae | 365/230.06 |
| 4,594,655 | 6/1986 | Hao et al. | 364/200 |
| 4,594,656 | 6/1986 | Moffett | 364/200 |
| 4,608,666 | 8/1986 | Uchida | 365/189.01 |
| 4,615,004 | 9/1986 | Chevillat et al. | 364/200 |
| 4,616,313 | 10/1986 | Aoyagi | 364/200 |
| 4,675,806 | 6/1987 | Uchida | 364/200 |
| 4,680,701 | 7/1987 | Cochran | 364/200 |
| 4,689,738 | 8/1987 | van Wijk et al. | 364/200 |
| 4,725,945 | 2/1988 | Kronstadt et al. | 364/200 |
| 4,731,761 | 5/1988 | Kobayashi | 364/230.06 |
| 4,740,894 | 4/1988 | Lyon | 364/200 |
| 4,766,566 | 8/1988 | Chuang | 364/900 |
| 4,803,621 | 2/1989 | Kelly | 364/200 |
| 4,860,249 | 8/1989 | Nicely et al. | 364/200 |
| 4,884,198 | 11/1989 | Garner et al. | 364/200 |

Primary Examiner—Michael R. Fleming
Assistant Examiner—Christopher B. Shin
Attorney, Agent, or Firm—Fitch, Even, Tabin & Flannery

[57] ABSTRACT

A four stage pipelined processor (40) provides efficient processing of the most common operation performed in simulating neuron networks. A first stage of the processor includes a program memory (42) and a program address generator (41). A second stage comprises first and second data memories (44, 46) and respective address generators (60, 66) coupled thereto. A third stage comprises the input (X, Y) of a function unit (82), and a fourth stage comprises the output (Z) of the function unit (82). A unique bus architecture allows the various stages to simultaneously communicate with each other through the use of independent buses, and further provides for the quick simultaneous transfer of data from both the first and second data memories to the function unit. When not needed for performing in the pipelined mode, the various buses may be coupled together and to an I/O interface (52) by means of bus coupling means (e.g., 47). This architecture significantly reduces the circuitry needed to implement the necessary buses while allowing the processor to run without speed limitations in the pipelined mode.

14 Claims, 2 Drawing Sheets

ARRAY PROCESSOR

The present invention relates to array or vector processors and more particularly to vector processors which are optimized for performing simulations of synaptic computer networks.

A number of specialized computing processors for performing certain types of repetitive calculations are known to the prior art. These processors include special hardware that allows them to carry out these calculations much more efficiently than general purpose computers. One type of special purpose processor is referred to as a vector or an array processor, because it is optimized for repeating certain mathematical operations on each element of an array. These calculations are mathematically equivalent to certain operations defined for vectors. For example, these processors can very efficiently multiply each element in one vector by the corresponding element in a second vector and sum the resultant products. That is, they compute S, where $$S = \Sigma x_i y_i \text{ for } i = 1, 2, \ldots n \tag{1}$$

This is equivalent to calculating the scalar product of two n dimensional vectors, X and Y, having components $x_i$ and $y_i$, respectively.

The time needed to perform this type of calculation limits our ability to simulate certain types of computer structures such as those carried out by networks of neurons. In neuron networks, each "neuron" carries out a calculation which includes the calculation shown in Eq. (1). Neuron networks of interest contain thousands of neurons; hence, the computational difficulty of simulating such networks requires more computing power than is typically available in all but the largest conventional computer systems. However, by including vector processing hardware in a smaller computer system, the computing capability of the smaller computer can be increased sufficiently to allow it to perform these types of simulations.

Typically, a vector processor includes a memory for storing two or more vectors and a function unit for performing mathematical operations on operands selected from the memory. Some vector processors also include a separate memory for storing a program which specifies the operations which are to be carried out.

If improvements are to be made in vector processors, either in terms of the speed with which a particular calculation is made or in terms of the cost per calculation, improvements must be made simultaneously in both the function unit and the memories. The time needed to complete a vector calculation may be limited either by the function unit or the memories in which the vectors are stored. Ideally, the memories should be matched in speed to the function unit so that each vector component is ready to be transferred to the function unit when the calculation currently being carried out by the function unit is completed.

The cost of a vector processor is the sum of the costs of the function unit and the various memories. Many problems, such as that of simulating a neuron network discussed above, involve large numbers of long vectors. As the size of the vectors stored increases, the cost of the vector processor approaches that of the memories. Hence, in vector processors requiring large amounts of memory, the cost of providing high speed memory limits the ability to improve the performance of the processors in question.

In one prior art solution to providing cost effective memory, relatively slow vector memories are used to store the vectors, and a high speed cache memory is introduced between the memory used to store the various vectors and the function unit. In this type of system, the function unit preferably operates on elements stored in the cache memory. When the function unit requires a particular operand, the processor first checks the cache memory to determine if the operand is stored therein. If the operand is in the cache memory, the function unit can proceed without delay to perform the calculation in question. If, however, one or more of the needed operands is not in the cache memory, the function unit must wait until the operand in question is fetched from the slower vector memories. By limiting the high speed memory to the cache, the cost of the vector processor is significantly reduced.

Unfortunately, cache memories only provide a significant improvement in those cases in which operands are used repetitively in the calculations. Consider the calculation shown in Eq. (1) above. Here each of the $x_i$ and $y_i$ are used only once in this calculation. Assuming that the $x_i$ and $y_i$ are stored in the vector memories at the start of the calculation, the time to perform the calculation can not be less than the time needed to read the $x_i$ and $y_i$ out of the vector memories either to the function unit directly or to the cache. Hence, unless the cache memory can access the data in the vector memories faster than the function unit can access the data, no improvement is provided by including the cache memory. Furthermore, cache memory systems significantly increase the cost of the vector processor.

Broadly it is an object of the present invention to provide an improved vector processor.

It is another object of the present invention to provide a vector processor with a large storage capacity without the increased costs associated with cache memories or large high speed memories.

It is yet another object of the present invention to provide a vector processor which is well suited to simulating synaptic networks.

These and other objects of the present invention will become apparent to those skilled in the art from the following detailed description of the invention and the accompanying drawings.

SUMMARY OF THE INVENTION

The present invention comprises an array processor adapted to be coupled to a host data processing system. The array processor includes a program memory for storing a plurality of instructions to be executed by the array processor. A selected one of these instructions is outputted from the program memory at any given time. The array processor also includes first and second data memories, each data memory comprises a means for storing a plurality of data words, means coupled to the program memory means for storing an address, and means for outputting a data word stored therein. The outputted data word is specified by the stored address. The stored address consists of segment and offset portions. The time between the storing of the address in a data memory and the time at which the data word specified by the address is outputted depends on whether or not the segment portion of the address differs from the segment portion of the address of the previously outputted data word in the memory. The time in question is reduced if the segment address of said data word and the previously outputted data word are the same relative to that experienced if the addresses of the two data words had different segment portions.

The array processor also includes a function unit having first and second input ports and an output port. The function unit performs arithmetic operations on first and second data words coupled to the first and second input ports, respectively. The function unit also includes means for outputting the result of the arithmetic operation on the output port.

The operations carried out by the array processor are controlled by a controller coupled to the program memory, the first and second data memories, and the function unit. The controller is responsible for executing the outputted instruction from the program memory including specifying the arithmetic operations performed by the function unit and the addresses stored in the first and second data memories, in response to said outputted instruction.

In addition, the array processor includes an I/O bus for coupling the host data processing system to one of the data memories in response to signals from the controller.

DETAILED DESCRIPTION OF THE INVENTION

Figure 1:
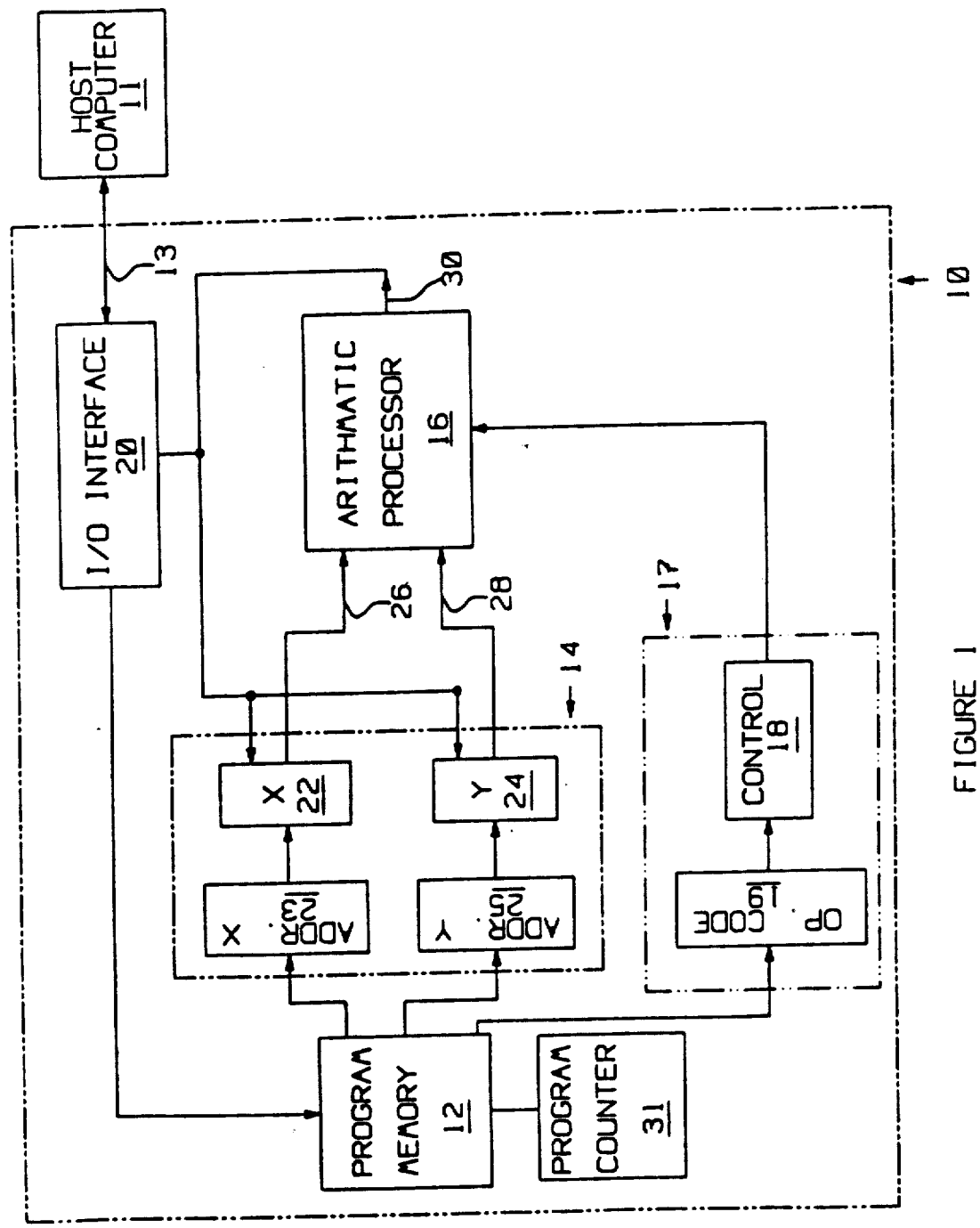
FIG. 1 is a block diagram of a vector processor according to the present invention.

A block diagram of a vector processor according to the present invention is shown in FIG. 1 at 10. Vector processor 10 communicates with a host computer 11 over a bus 13. Vector processor 10 has 5 functional elements, a program memory 12, a vector memory 14, an arithmetic unit 16, a control processor 17, and an I/O interface 20. Vector memory 14 is divided into sub-memories X and Y shown at 22 and 24 respectively. Each sub-memory is used to store one vector. The component of each vector which is to be applied to the arithmetic processor 16 is specified by a corresponding address register. Address register 23 provides the address for sub-memory 22, and address register 25 provides the address for sub-memory 24.

Arithmetic processor 16 operates on the values provided on its two input buses, 26 and 28 to produce a result on an output bus 30. The input values may be a component of a vector stored in the vector memory 14 or the result of a previous computation.

The program which specifies the operations carried out on the vectors stored in sub-memories 22 and 24 is stored in program memory 12. The specific instruction which is to be executed at any given time is specificed by a program counter 31. Instructions in program memory 12 may include two addresses. Each address specifies a value stored in the corresponding sub-memory, 22 or 24. Each instruction also includes an operation code 19 Which is coupled to controller 18. Controller 18 decodes the instruction and provides the appropriate control signals to arithmetic processor 16 and I/O interface 20. This connection to I/O interface 20 has been omitted to simplify the figure.

In the present invention, sub-memories 22 and 24 comprise static column dynamic random access memories (DRAMS). Both conventional and static column DRAM's store digital data as patterns of electric charge on capacitors which are located at the intersections of an internal array of rows and columns, one bit being stored at each such intersection. In a conventional DRAM, a specific bit of data is stored or retrieved by specifying its row and column addresses. In addition, row address and column address strobe signals must be provided at the time of the actual read or write operation. As a result, a full address cycle typically requires 200 to 300 nanoseconds.

A typical address cycle consists of placing the row address on the address inputs of the DRAM and then applying the row address strobe signal. When the row address signal transitions from high to low, the address input signals are used to specify the address of the row within the memory. Next the column address is entered in an analogous fashion. The column address is placed on the address inputs. The column address strobe signal is then applied to the memory, and the column address is copied from the address inputs when the column address strobe signal transitions from high to low.

Static column DRAM's can be accessed in a manner similar to that used in conventional DRAM's as described above. In addition, static column DRAM's can be accessed in a static column mode which allows more rapid access to the data stored therein. In static column mode, the row address and column, address strobe signals remain low for an extended period of time, typically 100 microseconds. While these signals are low, the address input signals are interpreted as the column address to the static column DRAM. The row address needed to complete the address is maintained in an internal register within the DRAM. When the address signals change, the DRAM rapidly accesses data at the new column address without the need to perform the full memory cycle described above. The access time in this mode is typically 25 to 50 nanoseconds. Hence, in static column mode, these memories may be as much as 8 times faster than conventional DRAM's.

Static column DRAM's have one major drawback, only data in the current row can be accessed in the static column mode. Hence, a significant speed improvement is only realized in those situations in which successive memory addresses are directed to data stored in the same row. That is, the difference between the addresses of successive data references must be relatively small. In a typical static column DRAM, each row has 1024 column addresses. Hence, if successive address references differ by more than 1024, static column mode is of little value.

As a result of this limitation, static column DRAM's are of only limited benefit in conventional general purpose computers, because such computers employ a single memory for storing both program instructions and data. Typically, the computer accesses an instruction and then accesses the data specified in the instruction. Since the instructions are typically stored at significantly different locations in the memory than those used to store data, successive memory references will be separated by address values Which are much greater than 1024.

The present invention makes use of the observation that this limitation is less severe in vector processors. A vector processor typically accesses large vectors with individual vector components being accessed sequentially. For example, consider the computation of the scalar product of two vectors X and Y, having components $x_i$ and $y_i$, as shown above in Equation (1). In the present invention, the components of vector X would be stored in sub-memory 22 and the components of vector Y would be stored in sub-memory 24. The computation would be performed by repeatedly multiplying one component from Y by the corresponding component in X and adding the result to a sum which is preferably stored in the arithmetic unit 16. If the components of each vector are stored contiguously in the respective sub-memories, successive memory references can almost always be constrained to be within the same row. Hence, the static column mode of sub-memories 22 and 24 may be used to advantage.

In the present invention, a separate memory 12 is also provided for storing the program instructions. This is particularly advantageous in applications which involve a high ratio of instruction fetches to data fetches, since the addresses of the sub-memories used to store the vectors need not be disturbed to fetch an instruction.

There are several conditions in a practical vector processor utilizing static column DRAM's which require special software and hardware. These conditions occur when an addressing operation in one of the memories results in a new address which has a row address different from that of the previously addressed data item from that memory. For example, the preferred embodiment of the present invention utilizes a four stage pipelined processing architecture which will be described in more detail below. In this type of architecture, if any of the memories cannot be addressed in the static column mode on a particular memory cycle, all memories must be addressed utilizing the full address cycle to preserve the timing relationships between stages in the processor.

Static column DRAM's must be refreshed periodically, typically every few milliseconds, to preserve the data stored therein. Modern DRAM's, including static column DRAM's, contain an internal address counter that is used to address rows within the memory during the refresh operation. This refresh operation is invoked by allowing the column address signal to transition low before the row address signal transitions low. This causes the internal refresh counter to advance to the next row in sequence which is then refreshed. During the refresh cycle, address inputs to the DRAM are ignored. On the average, one row must be refreshed every ten to twenty microseconds. However, the precise time at which a row is refreshed is not important so long as all rows are refreshed within a period of several milliseconds.

Since the refresh operation changes the row address, it interferes with the static column mode of addressing the memory. This refresh operation is of little consequence in conventional DRAM memories which do not use static mode addressing. However, in a vector processor, this causes a unique problem. One possible solution to this problem is to limit refresh cycles to periods between instructions. However, single vector processor processing instructions may be required to operate on large arrays of data and consequently require much longer to complete than do conventional computer instructions. Hence, it may not be possible to complete a single instruction before a refresh cycle is needed.

In the preferred embodiment of the present invention, this problem is overcome by maintaining a copy of the row address currently in use by each static column DRAM. This copy is stored in an external register, referred to as the segment register (S-REG). When a refresh interrupt occurs, all static column DRAM's in the array processor are simultaneously refreshed. On the memory cycle following the refresh cycle, all static column DRAM's are accessed with a full memory cycle. During this restore cycle, the row address is supplied by the segment register associated with each memory. Thus the entire processor is returned to its state prior to the interrupt before resuming static column mode operation.

As will be explained in more detail below, the preferred embodiment of the present invention includes counters in address registers 23 and 25. These counters are used to index an array stored in the corresponding sub-memory. If these counters are incremented or decremented across a row boundary, the row value must be incremented or decremented accordingly. This type of architecture does not pose problems in vector processors employing conventional DRAM's, since conventional DRAM's are always accessed with full address cycles. However, when static column DRAM's are employed using the static column address mode, an addressing error will occur unless circuitry is added to correct this problem. In the preferred embodiment of the present invention, an impending change in the row address is sensed and a full memory cycle access is then forced when such a change occurs.

When static column DRAM's are used for the program memory 12, a similar problem may occur when JUMP, JUMP TO SUBROUTINE, and RETURN FROM SUBROUTINE instructions are executed. In these cases, the program memory may be required to provide data from a different row address. The preferred solution to this problem is to sense during execution of the control instruction whether a row address has been changed and to force a full memory cycle to fetch the next instruction if this has occurred. An alternate solution requiring less hardware is to assume that all control instructions cause row address changes and to force a full memory cycle whenever a control instruction changes the program counter.

Program memory read and write operations are a final source of row address changes requiring full memory cycles. These operations are rare in the present invention, because separate program and data memories are used. However, such instructions are essential to perform program loading, memory management, and testing functions. Hence, provisions must be made to force full memory cycles when such operations cause a change in the row address. The preferred solution to this problem is to employ instructions which read and write memory in blocks whenever possible and to force a full memory cycle when accessing the first word of a block of program memory in a block read or write operation. In addition, full memory cycle accesses are required to fetch the next instruction after the completion of the block read or write instruction.

Figure 2:
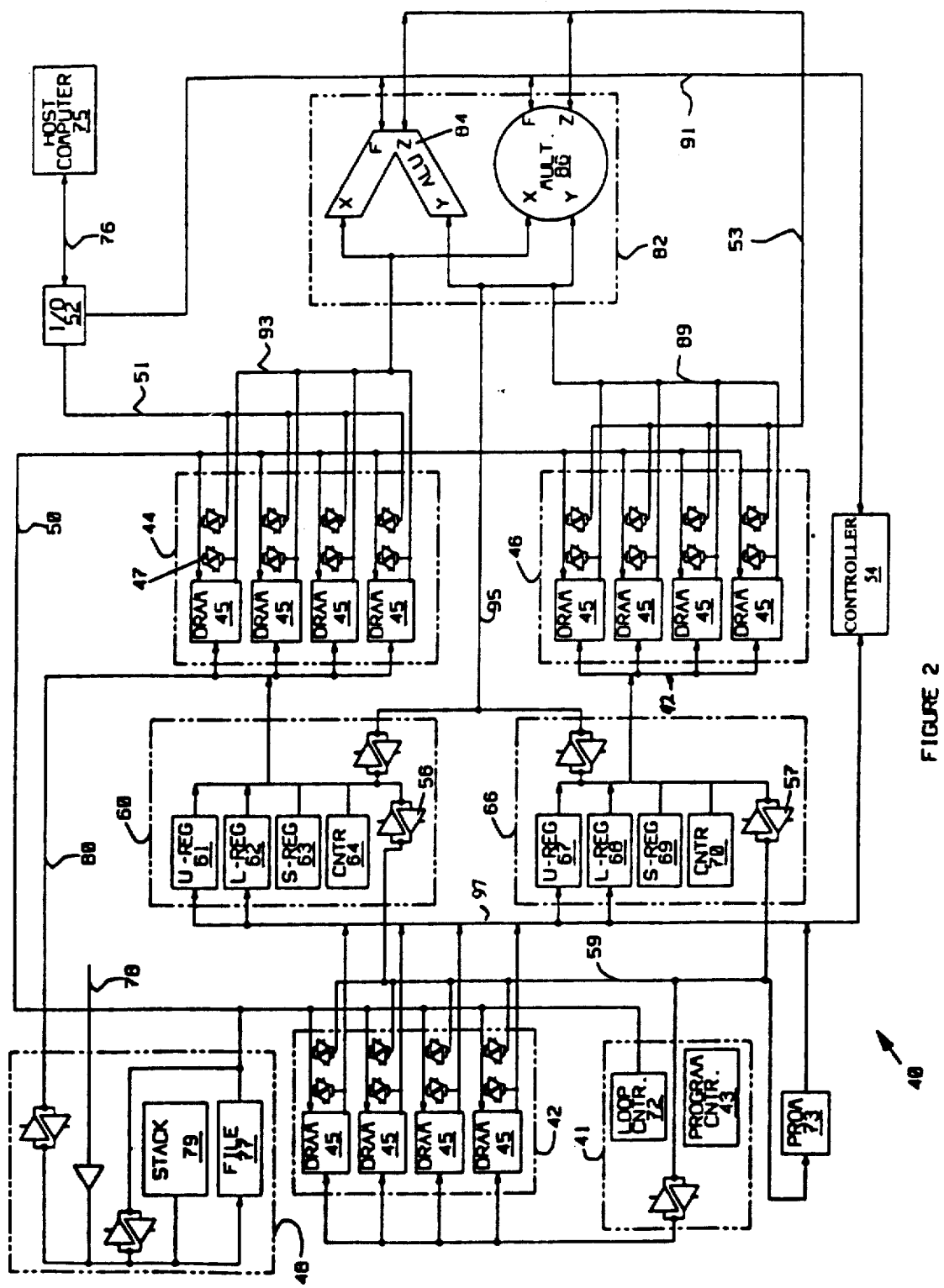
FIG. 2 is a block diagram of the preferred embodiment of the present invention.

The manner in which these problems are overcome in the preferred embodiment of the present invention can be more easily understood with reference to FIG. 2 which is a block diagram of the preferred embodiment of a vector processor 40 according to the present invention. Vector processor 40 is based on four memories, a program memory 42, two data memories 44 and 46, and a "file" 48. All of these memories are preferably 32 bits wide. Program memory 42 is intended to be used for executable code and is the only memory which has hardware to support code execution. However, in some cases, it may also be used to store data. The address of the current instruction is specified by a program address generator 41 Which includes a program counter 43.

Data memories 44 and 46 are designed for data storage, especially large arrays. Data words in data memories 44 and 46 are specified by address generators 60 and 66, respectively. Address generators 60 and 66 will be discussed in more detail below. The "file" 48 is used for storing smaller data entities and for temporary storage registers. The operation of file 48 will also be discussed in more detail below.

Data memories 44 and 46 each store one million 32-bit data words. These memories are constructed from 1-megabit static column DRAM's. To provide access to each of the 4 bytes in each data word, each of the data memories 44 and 46 is organized as 4 1-megabyte sub-memories 45. Each of the sub-memories may be coupled to one of two buses for inputting data thereto through bus couplers of which 47 is typical. The sub-memories in data memory 44 can be coupled to buses 50, 51 or 93. Similarly, the sub-memories in data memory 46 can be coupled to buses 50, 53, or 89. The various bus couplers are controlled by controller 54. The specific connections between the bus couplers and controller 54 have been omitted from FIG. 2 for clarity.

Data memories 44 and 46 require a 20-bit address to specify a data word stored therein. This address is divided into a 10-bit segment address which specifies the row address, i.e., the most significant 10 bits of the address and a 10-bit offset address, i.e., the column address. Segment and offset addresses may be generated in several ways. For example, the segment and offset address may be explicitly given in the current instruction. This type of addressing is referred to as full-memory addressing. These addresses are then coupled to the respective memories by placing them in the corresponding U-Reg, 61 or 67, and the corresponding L-Reg, 62 or 68. As will be explained in more detail below, each instruction has sufficient space to specify two 10-bit addresses. Hence, only one of the memories 44 or 46 may be addressed in a mode requiring a 20-bit address at any given time. Hence, in full memory addressing, the outputs of the two U-REG's, 61 and 67, are always caused to be identical by controller 54. Similarly, the contents of the two L-REG's, 62 and 68, are always identical. The specific instruction contains the information specifying whether memory 44 or memory 46 is to be updated.

A number of alternative methods of addressing memories 44 and 46 make use of a special set of registers included in address generating circuitry coupled to each of these memories. Address generator 60 includes 4 registers, 61–64, Which are used to generate addresses for specifying data words in memory 44. Similarly, address generator 66 includes registers 67–70 Which are used to generate addresses for specifying data words in memory 46.

In one mode of address generation which utilizes these registers, referred to as offset addressing, only the offset of the address in question is specified in the instruction. The segment portion of the address is stored in an internal register in the DRAM. This mode permits two words in different memories to be simultaneously addressed by a single 20-bit address. For example, address generator 60 includes a U-REG 61 which is used to specify the current segment of the address specified in memory 44. An instruction which uses offset addressing, however, uses the value in U-REG 61 for the offset address in memory 44 and the value of the L-REG 68 for the offset address in memory 46.

Offset addressing makes use of the static column mode of operating memories. Hence, offset addressing requires typically one third the time needed to generate an address using full-memory addressing. In addition, offset addressing permits accessing of two operands simultaneously using a single instruction which further doubles the speed of processing by eliminating the time needed for fetching an additional instruction. Hence, this type of addressing is preferred. Typically, the first data word of a sequence of data words having the same segment address is addressed using full-memory addressing. Successive data words are then addressed using offset addressing.

The offset address may be supplied by the value in L-REG 62 or L-REG 68, or the value in an address counter, CNTR 64 or CNTR 70, included in each address generator. The address counters are particularly useful in implementing array or vector instructions, i.e., instructions which operate on successive elements of an array of data values stored in the memory coupled to the address generator containing the counter in question. Each address counter is automatically incremented (or decremented, depending on the memory mode) every time the counter is referenced by an instruction. These counters are used in conjunction with a loop counter 72 which is part of the program address generator 41 to implement array or vector instructions. Since the counters only specify the offset address, special precautions must be taken to assure that the array lies entirely in one segment. If this is not the case, code must be inserted to alter the segment address and counter value when a segment boundary is crossed. This may be accomplished by the compiler which is used to generate the computer code stored in program memory 42.

Loop counter 72 is preferably a 16-bit countdown register. It is tested and then set. The lowest valid value is 0. Loop counter 72 is decremented by testing its value in a branch instruction and by a class of instructions referred to as "repeated" instructions of Which array instructions are a sub-class. Repeated instructions are single instructions which rely on counters 64 and 70 for their address. The single instruction in question is repeatedly executed until loop counter 72 has expired, i.e., when its value is −1.

The S-REG's 63 and 69 store the current segment address. These registers are used for resetting the corresponding memory row address after a memory refresh interrupt has occurred. Since the DRAM's do not contain internal column address registers, no additional storage is required to protect offset address values. When any instruction that alters the row address in one of memories 44 or 46 is executed, controller 54 causes the new segment address to be stored in the corresponding S-REG. At the end of a refresh interrupt, the segment address values stored in the S-REG's, 63 and 69, are used to restore the segment address in the memories by executing a full memory cycle using the contents of the S-REG for the segment address.

In the preferred embodiment of the present invention, the program memory 42 is also one million 32-bit words. Although program memory 42 is physically constructed from the same memory chips as data memories 44 and 46, normally, the program memory is not addressed using separate segment and offset addresses. Instead, program memory is addressed using a single 20-bit absolute address which may be specified by program counter 43. However, the program memory is addressed identically to memory 46 with the address supplied through bus couplers 56 and 57 during certain operations including program memory read and write operations.

The upper 2,048 words of program storage space is mapped to a read only memory, PROM 73. PROM 73 is used to store an executive program for controlling certain operations. For example, the executive program is responsible for down-loading programs from a host computer 75 which is coupled to vector processor 40 by bus 76 through I/O interface 52.

The file 48 includes a 1,024 word memory 77 which is accessed by a 10-bit address on bus 50. Because the file has no segments, it is an ideal place to store temporary variables without being concerned about changing the current segment address in one of the data memories. Data stored in file 48 may be coupled to the address bus 80 of data memory 44 for use in addressing operations. Hence, by using the various bus couplers, data from the data memories or function unit 82 may be transferred to and from file 48.

The first 16 storage locations in file 48 are designated as "registers" and are specified by a 4-bit address on bus 78 which is controlled by controller 54. These locations are physically the same as the rest of the storage locations in file 48, except that instructions have been implemented which expand their functionality for simulating conventional address registers.

File 48 also includes a stack 79 which is used to implement subroutine calls. Addresses are automatically pushed and popped on subroutine calls and returns, respectively.

Operations, including arithmetic operations, on the data values stored in data memories 44 and 46 are performed by function unit 82. Function unit 82 includes an arithmetic logic unit (ALU) 84 and a multiplier 86. Multiplier 86 and ALU 84 are preferably capable of 32 and 64-bit integer and floating point operations. Multiply, divide and square-root functions are performed by multiplier 86. All other operations are carried out in ALU 84.

Both ALU 84 and multiplier 86 have three data registers, labeled X, Y, and Z. Data is input to either the X register or Y register. The results of the operations performed are left in the Z register. The results to be entered into the X register are placed on a bus 93. Those to be entered into the Y register are placed on bus 89. The results in the Z register are available on a bus 53. A result from an operation in multiplier 86 may be used as an input to ALU 84 by passing the result via buses 53 and 89 to the Y register of ALU 84. In the preferred embodiment, ALU 84 also includes circuitry for transferring a result on bus 53 to the X register in ALU 84. This latter means of coupling a result to ALU 84 is particularly useful in implementing instructions for carrying out calculations such as that shown in Eq. (1) above.

ALU 84 and multiplier 86 communicate with controller 54 via bus 91 and are controlled by signals on this bus. In the preferred embodiment, ALU 84 and multiplier 86 each have three other internal registers of note, a flag register, an interrupt register, and a mode register for specifying the operation to be carried out. In addition, ALU 84 includes a shift register whose value controls the direction and degree of shift instructions. The interrupt registers do not generate actual interrupts in the preferred embodiment. Instead, each interrupt register is used in conjunction with the flag register to determine when a specific combination of flags and interrupts occurs.

Function unit 82 may also be used to operate on data contained in the address field of an instruction or in one of the registers in address generator 60 or address generator 64. This is accomplished by coupling the data to function unit 82 by bus 95. The data in question is then coupled to the Y register of ALU 84 or multiplier 82. The results of the operation in question may be returned to program memory 42 via buses 53 and 50 utilizing the bus couplers in data memory 46 to connect the two buses in question.

In the preferred embodiment of vector processor 40, all instructions are specified by a single 32-bit word which may have one of two interpretations. In both cases, the high-order 12 bits of the instruction contain a 12-bit operation code which is used as an index into a microcode PROM contained in controller 54. The remaining 20 low-order bits contain operand information.

In the first of the two types of instructions, the 20 operand bits are divided into two 10-bit fields. When an instruction is performed which operates on both memories at once, one of these 10-bit fields specifies the offset in data memory 42 and the other specifies the offset in data memory 44. If the instruction is a two operand instruction, the data specified by one field becomes the input to an x register in function unit 82 and the data specified by the other field becomes the input to the corresponding y register.

There are also several instructions in which a single operand is specified. For example, instructions which specify a segment address and an initial counter value. In these instructions, one field is used for specifying the segment address and the other is used for specifying the initial counter value.

In the second type of instruction, the operand is interpreted as a single 20-bit value, for example a non-negative 20-bit integer to be used in a computation in function unit 82. In this case, the upper 12-bits are masked by the hardware.

As mentioned above, vector processor 40 shown in FIG. 2 is preferably a four stage pipelined processor. The first stage of vector processor 40 is the program memory 42 and the program address generator 41. The second stage of vector processor 40 comprises data memories 44 and 46 and the address generators 60 and 66 coupled thereto. The third stage of vector processor 40 is the input to function unit 82, and fourth stage of vector processor 40 is the output of vector processor 40.

The stages are synchronized as follows. The program address generator addresses program memory 42 to fetch an instruction for each instruction cycle. As noted above, the instruction fetched contains an operation code and two addresses. While the instruction is being fetched, the two addresses from the previous instruction are being used to address data memories 44 and 46. The operation code from this previous instruction is simultaneously decoded by the controller 54. It will be apparent to those skilled in the computer arts that controller 54 may employ a mapping PROM, a programmed logic array, or hard-wired circuitry for this operation.

Simultaneously with these two events, the two operands addressed by the instruction fetched two cycles earlier enter function unit 82 for processing. For certain operations, including the vector inner product operation shown in Eq. (1), the two operands are first processed by multiplier 86, and simultaneously, the result from the previous instruction is further processed by ALU 84. Finally, the result of the instruction fetched three (or four) cycles earlier is made available on bus 53.

As noted above, the result of an operation in function unit 82 may be retained in function unit 82 or be written back to one or both of the data memories. This feature is highly advantageous in neuron network simulation, since the most common operation performed by vector processor 40 when simulating neuron networks is the calculation $$Z' = Z + X*Y \qquad (2)$$

Here, Z is the result previously retained in function unit 82, Z' is a new result retained in function unit 82, and X and Y are the operands from data memories 44 and 46.

The timing of the memory cycles is preferably built into controller 54. The memory cycles are specified by the operation codes. For example, wait states may be introduced after instructions which require full memory cycles as part of the instruction decoding process.

To implement this type of pipelined architecture, particular care must be taken in designing the bus structures. Since the various stages are simultaneously communicating with each other, each stage must be coupled to the next stage by a bus which is independent of the buses used for coupling the other stages. However, each of the stages must also be capable of being coupled to the I/O interface 52 to allow data to be transferred to and from host computer 75. In addition, function unit 82 is preferably capable of being coupled to any of the memories or registers to allow results to be quickly transferred from function unit 82 to the memory or register in question.

In the preferred embodiment of the present invention, a multiple bus structure with buses that can be coupled together at key points is advantageously utilized. Program memory 42 is coupled to the address generators 60 and 66 by bus 97. The previously specified addresses are coupled to memory 44 by bus 80 and to memory 46 by bus 92, and to program memory 42 via bus couplers 56 and 57 from buses 80 and 92 to bus 59. The operand from memory 44 specified two instructions earlier is coupled to function unit 82 by bus 93 and that from memory 46 by bus 89. The result from the instruction three or four cycles earlier is placed on bus 53.

When not needed for performing in the pipelined mode, the various buses may be coupled together and to I/O interface 52 by utilizing the bus couplers shown in memories 48, 44, and 46. Additional couplings may be made using the bus couplers in address generators 41, 60 and 66. This bus architecture significantly reduces the amount of circuitry needed to implement the necessary buses while allowing vector processor 40 to run without speed limitations in the pipeline mode.

Although the present invention has been described with reference to static column DRAM's, it will be apparent to those skilled in the computer arts that the data memories may be advantageously constructed from other memory devices. An alternative memory device need have two properties. First, it must accept an address which is divided into segment and offset portions, the current value of the segment address being stored in a register which is preferably included in the memory. Second, the memory cycle time when only the offset portion of the address is changed must be less than the cycle time when both the segment and offset portions of the address are changed.

Accordingly, an improved array or vector processor has been described in which the static column mode of operation of DRAM's is used to improve the operating speed of the processor. Various modifications and additions will be apparent to those skilled in the computer arts. In particular, it will be apparent to those skilled in the art that different numbers of data memories may be used including memories having different numbers of bits. In addition, different instruction formats may be used. Hence, the scope of the invention is to be limited only by the following claims.

What is claimed is:

1. An array processor (10) adapted to be coupled to a host data processing system (11), said array processor comprising:
program memory means (12) for storing a plurality of instructions to be executed by said array processor;
first and second data memory means (14), each of said first and second data memory means comprising:
data word storing means (22, 24) for storing a plurality of data words, said data word storing means comprising static column DRAM's,
address storing means (23, 25) coupled to said program memory means (12) and said data word storing means (22, 24) for storing an address including segment and offset portions, said address storing means comprising
a first register for storing the segment portion of said address of said data word to be outputted by the data word storing means of said data memory means,
a second register for storing the offset portion of said address of said data word to be outputted by the data word storing means of said data memory means, and
a third register coupled to said first register for also storing the segment portion of said address, and
means for causing said segment portion stored in said third register to become the segment address of the next data word to be outputted by the data word storing means,
output means for outputting a data word stored in said data word storing means, said outputted data word being the data word stored in the data word storing means (22, 24) at a specified address stored in the address storing means (23, 25),
said outputted data word being provided within a memory cycle time that depends on whether or not the segment portion of said address differs from the segment portion of a most recent previously outputted data word,
said memory cycle time being less when the segment address of said data word and said most recent previously outputted data word are the same than when the segment address of said data word and said most recent previously outputted data word are not the same;
function means (16) including first and second input ports and an output port separate and independent of said first and second input ports, said first and second input ports being separately and independently coupled to said first and second output means of said first and second data memory means, respectively, said function means comprising:
arithmetic means for performing arithmetic operations of first and second data words coupled to said first and second input ports from the output means of said first and second data memory means, respectively, and result means for outputting the result of said arithmetic operation on said output port, whereby said first output means in said first data memory means simultaneously couples said data word outputted therefrom to said first input port of said function means at the same time that said second output means in said second data memory means couples said data word outputted therefrom to said second input port of said function means;

control means (17, 31) coupled to said program memory means (12), first and second data memory means (14), and function means (16) for specifying a particular instruction stored in said program memory means that is to be executed by said array processor, said particular instruction specifying an arithmetic operation to be performed by said function means on the first and second data words stored in the data word storing means of said first and second data memory means, respectively, and further specifying particular operations to be performed on the addresses stored in the address storing means of said first and second data memory means, said control means including means for generating control signals that are directed to said first and second data memory means (14) and said function means (16) for executing said instructions; and I/O bus interface means (20) for selectively coupling said host data processing system (11) to one of said first and second data memory means (14), said program memory means (12), or said output port (30) of said function means (16) in response to the control signals from said control means;

whereby an array of data words may be selectively transferred to said first and second data memory means (14) from said host data processing system (11) through said I/O bus interface means (20) and efficiently processed in accordance with particular instructions stored in said program memory means (12) as specified by said control means (31), the results of such processing being returned to said host data processing system (11) through said I/O bus interface means (20) as controlled by said control means (17).

2. The array processor of claim 1 wherein each of said address storing means (23, 25) further comprises a counter coupled to said second register and said control means for storing a count which specifies said offset portion of said address, said count being initially set to a first predetermined value determined from the offset portion of said address stored in said second register, said count being altered by a predetermined amount each time an instruction referencing said counter is executed by said control means.

3. The array processor of claim 1 wherein said control means includes refresh means for refreshing said static column DRAM's, said refresh means comprising:

means within said control means for generating a refresh interrupt signal;

means responsive to said refresh interrupt signal for refreshing the data words stored in said DRAM's; and means, responsive to the end of the refresh interrupt signal for transferring said segment portion stored in said third register included in said address storing means in each of said first and second data memory means to the respective static column DRAM, whereby the segment address of the next data word to be outputted by said data word storing means becomes the segment portion stored in said third register.

4. The array processor of claim 1 further comprising:

a first data bus (26) for coupling said output means in said first data memory means to said first input port of said function means;

a second data bus (28) for coupling said output means in said second data memory means to said second input port of said function means;

a function data bus (30) for coupling said output port of said function means to the second data memory means in response to a control signal generated by said control means; and bus coupling means responsive to control signals from said control means for coupling said function data bus to said second data bus.

5. The array processor of claim 4 further comprising:

a transfer bus coupled through said bus coupling means to said first and second data memory means and said program memory means, whereby said first and second data memory means may be selectively coupled to said program memory means via said transfer bus in response to control signals from said control means;

means for coupling said function data bus to said transfer bus in response to control signals from said control means;

means for coupling said I/O bus interface means to said transfer bus in response to control signals from said control means;

means for coupling said first data bus to said transfer bus in response to control signals from said control means; and means for coupling said transfer bus to said I/O bus interface means in response to control signals from said control means.

6. The array processor of claim 1 wherein said function means includes means for retaining the result of a previous arithmetic operation as one of the second data words used by said function means in the next arithmetic operation to be performed by said function means.

7. A four-stage pipelined vector processor (40) for efficiently processing data arrays or vectors comprising:

a first stage comprising a program memory (42) and a program address generator (41), said program address generator being coupled to said program memory, said program memory having a plurality of instruction words stored therein, each instruction word including an operational code and two addresses;

a second stage comprising a first data memory (44), a first address generator (60) coupled to said first data memory, a second data memory (46), and a second address generator (66) coupled to said second data memory, each of said first and second address generators being coupled to said program memory, and each of said first and second program memories including input means for writing an operand thereto at an address specified by the respective address generator, and output means for reading a previously stored operand therefrom at an address specified by the respective address generator, said first address generator (60) and said second address generator (66) each further including a segment register (61, 67) and a offset register (62, 68);

a third stage comprising a function unit (82), said function unit having a dual input (X,Y) and having means for carrying out a specified function, such as multiplication or addition, on operands presented at said dual input, and for placing a result of said specified function on an output (Z) of said function unit;

a fourth stage comprising said output (Z) of said function unit;

a first data bus (93) connecting the output means of said first data memory to one of said dual inputs (X) of said function unit (82);

a second data bus (89) connecting the output means of said second data memory to the other of said dual inputs (Y) of said function unit (82);

a third data bus (53) selectively connecting said output (Z) of said function unit to the input means of said first and second data memories (44, 46);

bus coupling means (47) for selectively interconnecting said third data bus to said first or second data buses, whereby the output (Z) of said function unit (82) may be selectively connected to either of its dual inputs (X, Y);

controller means (54) for defining an instruction cycle, and for decoding the operational code contained in the instruction word in said program memory (42) addressed by said program address generator (41), and for further providing control signals to said function unit (82) and to said bus coupling means (47) for carrying out an operation specified by said operational code, and for synchronizing the operation of the stages of said pipelined vector processor so that simultaneously during each instruction cycle:

the program address generator addresses the program memory (42) to fetch an instruction word, the data memories (44, 46) are respectively addressed by the two addresses from the instruction word fetched during the previous instruction cycle, the operational code from the instruction word fetched during the previous instruction cycle is decoded by the controller means (54), the two operands addressed by the instruction word fetched during the instruction cycle occurring two cycles earlier, or the output (Z) of the function unit (82) and one of said two operands, are respectively transferred to the dual input (X, Y) of the function unit (82) over the first and second data buses (93, 89), the two operands appearing at the dual input (X, Y) of the function unit (82) are processed in accordance with the operational code in the instruction cycle occurring two cycles earlier, at least a portion of the two addresses contained in each instruction word are respectively loaded into at least one of said segment or offset registers, and the result produced by the function unit (82) during the previous instruction cycle is made available on the third data bus (53), which result reflects the processing carried out by the function unit as a result of the operational code in the instruction word fetched during the instruction cycle occurring more than two cycles earlier; and an I/O interface (52) for selectively coupling a fourth data bus (51) to a host computer (75) as controlled by the controller means (54), said fourth data bus also being connected to said bus coupling means (47), whereby the operands or result produced by the function unit may be selectively transferred to and from the host computer;

whereby the stages of said pipelined vector processor may simultaneously communicate with each other over data buses that are independent of the data buses used for coupling the other stages, and further whereby the result produced by the function unit (82) may be selectively retained in the function unit or written back to the first or second data memories (44, 46), thereby greatly facilitating calculations of the form $Z' = Z + X*Y$, where Z is the result previously retained in the function unit (82), Z' is a new result retained in the function unit, X and Y are the operands from the first and second data memories (44, 46), typically representing corresponding operands of respective data arrays or vectors, and * represents a mathematical operation, such as multiplication.

8. The vector processor as set forth in claim 7 further including a file memory (48) coupled to said bus coupling means (47) over a fifth data bus (50), whereby said file memory may be selectively coupled to said first, second, third or fourth data buses.

9. The vector processor as set forth in claim 7 wherein:

said vector processor includes offset addressing means for simultaneously addressing two operands, one in each of said first and second data memories (44, 46) with a single instructional word, said offset addressing means including means for loading an initial full segment address into the respective segment registers (61, 67) of said first and second address generators (60, 66), and means for simultaneously loading two full offset addresses into the respective offset registers (62, 68), each offset address specifying the offset location of a desired operand in the respective data memory having a segment address corresponding to the segment address previously loaded into the respective segment register, said two full offset addresses being specified in a single instruction word, whereby, subsequent to the loading of a full segment address into said segment registers, a desired operand in each of said first and second data memories, each having the full segment address loaded into the respective segment register, can both be accessed simultaneously using a single instructional word within a single instruction cycle;

whereby a vector comprising an array of operands stored in each of said first and second data memories (44, 46) so as to respectively share a common segment address can thereafter be retrieved for processing in said function means (82) within a minimum number of instruction cycles.

10. A vector processor comprising:

a program memory (42) having a plurality of instruction words stored therein, each instruction word including an operational code and address information;

a first data memory (44) having a first set of operands stored therein;

a second data memory (46) having a second set of operands stored therein;

a first address generator (60) coupled to said program memory, said first address generator including first address register means (61-64) coupled to said first data memory for specifying a first address within said first data memory where a first desired operand is located, said first specified address being obtained from the address information obtained from an instruction word fetched from said program memory;

a second address generator (66) coupled to said program memory, said second address generator including second address register means (67-70) coupled to said second data memory for specifying a second address within said second data memory where a second desired operand is located, said second specified address being obtained from the address information obtained from an instruction word fetched from said program memory;

said first address generator (60) and said second address generator (66) each including segment registers (61, 63; 67, 69) and an offset register (62, 68);

program address generator means (41) for fetching a particular instruction word from said program memory;

a function unit (82), said function unit having a dual input (X,Y) and having means for carrying out a specified function, such as multiplication or addition, on respective operands presented at said dual input, and for placing a result of said specified function on an output (Z) thereof;

a first data bus (93) connecting said first data memory (44) to one of said dual inputs (e.g., X) of of said function unit (82);

a second data bus (89) connecting said second data memory (46) to the other of said dual inputs (e.g., Y) of said function unit (82);

a third data bus (53) selectively connecting said output (Z) of said function unit to one of said first or second data memories (44, 46), whereby the result of said specified function carried out by said function unit may be selectively routed to said one or said first or second data memories;

bus coupling means (47) for selectively interconnecting said third data bus (53) to said second data bus (89), whereby the output (Z) of said function unit (82) may be selectively connected via said third and second data buses to one of the dual inputs (e.g., Y) of said function unit;

controller means (54) for defining an instruction cycle, and for decoding the operational code contained in the instruction word in said program memory (42) addressed by said program address generator (41), and for further providing control signals to said function unit (82) and bus coupling means (47) for carrying out an operation specified by said operational code, and for synchronizing the operation of said vector processor so that during each instruction cycle:

the program address generator (41) addresses the program memory (42) to fetch an instruction word, the first and second data memories (44, 46) are respectively addressed by the address register means of the first and second address generators (60, 66), an operational code from a prior fetched instruction word is decoded by the controller means (54), the first and second data buses are respectively connected to the dual input (X, Y) of the function unit (82), thereby selectively transferring the addressed operands from the first and second data memories and/or the output (Z) of the function unit to the dual input of the function unit, the function unit (82) performs the function specified by the operational code of an appropriate instruction word on the two operands appearing at its dual input (X, Y), the result produced by the function unit (82) is made available on the third data bus (53), and at least a portion of the two addresses contained in each instruction word are respectively loaded into at least one of said segment or offset registers;

whereby said vector processor simultaneously passes operands and results from processing said operands between its various elements over data buses that are independent and separate from each other, thereby maximizing the speed at which the processing carried out by said vector processor is performed.

11. The vector processor as set forth in claim 10 further including:

an I/O interface means (52) for selectively coupling a fourth data bus (51) to a host computer (75) as controlled by the controller means (54), said fourth data bus also being connected to said bus coupling means (47); and a fifth data bus (50) connected to said bus coupling means (47) and said program memory (42);

whereby the first data memory (44) may be selectively coupled through said bus coupling means to any of said first, fourth or fifth data buses (93, 51 or 50), and said second data memory (46) may be selectively coupled through said bus coupling means to any of said second, third, or fifth data buses (89, 53 or 50);

whereby the operands or results produced by the function unit may be selectively transferred to and from the host computer, and instruction words may be selectively transferred to said program memory (42) from said host computer (75).

12. The vector processor as set forth in claim 11 further including a sixth data bus (59) coupled to said bus coupling means for selectively connecting said fifth data bus (50) to said program address generator (41), whereby said program address generator may also be selectively coupled to said host computer (75) through said fourth, fifth, and sixth data buses as coupled by said bus coupling means.

13. The vector processor as set forth in claim 12 further including a file memory (48) coupled to said bus coupling means (47) over said fifth data bus (50), whereby said file memory may be selectively coupled to said first, second, third, fourth, or sixth data buses.

14. The vector processor as set forth in claim 10 wherein said vector processor includes offset addressing means for simultaneously addressing two operands, one in each of said first and second data memories (44, 46) with a single instructional word, said offset addressing means including means for loading an initial full segment address into the respective segment registers (61, 63; 67, 69) of said first and second address generators (60, 66), and means for simultaneously loading two full offset addresses into the respective offset registers (62, 68), each offset address specifying the offset location of a desired operand in the respective data memory having a segment address corresponding to the segment address previously loaded into the respective segment registers, said two full offset addresses being specified in a single instruction word, whereby, subsequent to the loading of a full segment address into said segment registers, two desired operands, one in each of said first and second data memories, each having the full segment address loaded into the respective segment register, can both be accessed simultaneously using a single instructional word within a single instruction cycle;

whereby a vector comprising an array of operands stored in each of said first and second data memories (44, 46) so as to respectively share a common segment address can thereafter be retrieved for processing in said function means (82) within a minimum number of instruction cycles.

* * * * *

UNITED STATES PATENT AND TRADEMARK OFFICE
CERTIFICATE OF CORRECTION

PATENT NO. : 4,974,146

DATED : November 27, 1990

INVENTOR(S) : George Works

It is certified that error appears in the above-identified patent and that said Letters Patent is hereby corrected as shown below:

Column 3, line 56, change "specificed" to --specified--.

Column 3, line 61, change "Which" to --which--.

Column 4, line 60, change "Which" to --which--.

Column 7, line 2, change "Which" to --which--.

Column 7, line 53, change "Which" to --which--.

Column 7, line 55, change "Which" to --which--.

Column 8, line 41, change "Which" to --which--.

UNITED STATES PATENT AND TRADEMARK OFFICE
CERTIFICATE OF CORRECTION

PATENT NO.   :   4,974,146

DATED        :   November 27, 1990

INVENTOR(S)  :   George Works

It is certified that error appears in the above-identified patent and that said Letters Patent is hereby corrected as shown below:

Column 17, line 35, delete the second occurence of "of".

Signed and Sealed this

Twenty-sixth Day of May, 1992

Attest:

DOUGLAS B. COMER

Attesting Officer

Acting Commissioner of Patents and Trademarks